L. CHOLLET.
SOUND SIGNALING DEVICE.
APPLICATION FILED AUG. 11, 1919.
1,391,367.
Patented Sept. 20, 1921.
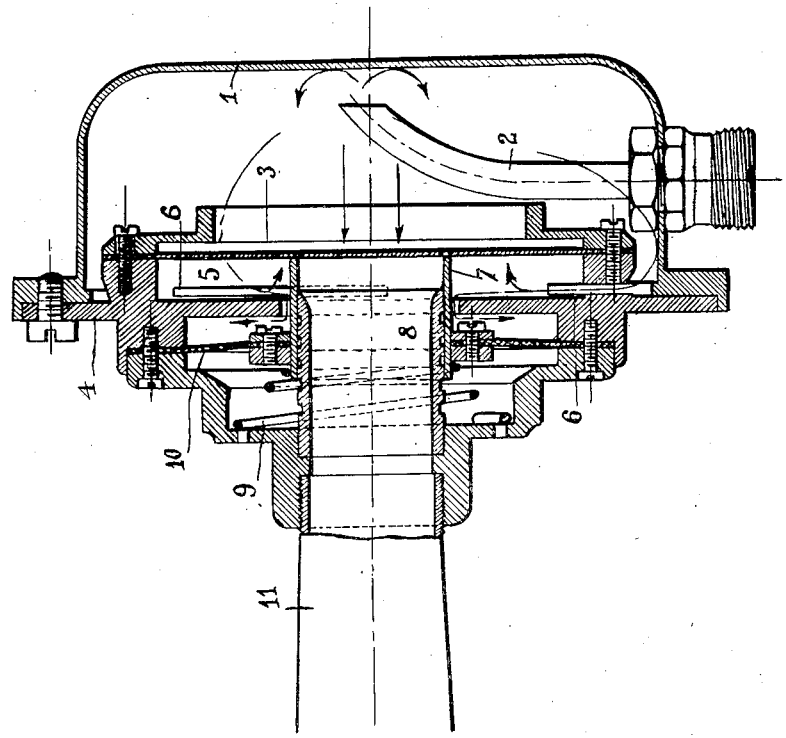

UNITED STATES PATENT OFFICE.

LOUIS CHOLLET, OF PARIS, FRANCE.

SOUND SIGNALING DEVICE.

1,391,367.  Specification of Letters Patent. Patented Sept. 20, 1921.

Application filed August 11, 1919. Serial No. 316,827.

(GRANTED UNDER THE PROVISIONS OF THE ACT OF MARCH 3, 1921, 41 STAT. L., 1313.)

*To all whom it may concern:*

Be it known that I, LOUIS CHOLLET, a citizen of the Republic of France, residing at Paris, in the Republic of France, have invented certain new and useful Improvements in Sound Signaling Devices, (for which I have filed applications in France, Oct. 1, 1913, 473,617; Germany, Dec. 19, 1913, 24,222; France, (1st addition,) Jan. 12, 1914, 19,442; France, (2nd addition,) June 5, 1914, 19,456; Spain, Dec. 12, 1917, 64,121; Italy, May 19, 1919; Belgium, May 23, 1919; Great Britain, May 28, 1919, 13,447,) of which the following is a specification.

The present invention relates to sound signaling devices which may be applied to automobiles, motor boats, aircraft and the like purposes.

According to the present invention compressed air, the exhaust gas from an engine or other suitable source of fluid under pressure is led to both sides of a nonvibrating plate clamped at its periphery and capable of automatic adjustment after such signal has been given according to the pressure of the operating fluid.

The invention is more particularly described with reference to the accompanying drawing showing one form of construction by way of example, and in sectional elevation.

The device comprises a box 1 into which air from a pump or the like is passed under pressure, by means of a pipe 2 to abut against a wall of this box and so free it of any trace of water or oil which may be suspended in it; this water or oil accumulating in the base of the box.

Within the box 1 is mounted a plate 3 or other suitable metal or alloy, and this plate is clamped on its whole periphery. The cover 4 closing the box forms with the plate 3 a chamber 5 communicating with the box, through openings 6.

The end of a tube 7 within the chamber 5 and capable of sliding on a fixed tube 8 comes into contact with a spring 9 arranged behind a flexible membrane 10 of leather, rubber or other suitable material which membrane carries the movable tube 7.

The horn or trumpet 11 is suitably secured to the tube 8.

It will be seen from the above that air or fluid under pressure strikes both faces of the plate 3, on one face directly after having filled the space within the chamber 1, on the other through openings 6 arranged with the metal lid.

The advantage of this arrangement is that the plate instead of moving in one direction only as in previous arrangements and thereby taking up a concave form due to the pressure of usually some pounds it receives equal pressure on both sides. It is therefore virtually floating between two pressures, equal and opposite.

Further in present construction, once the distance between plate and tube is predetermined, the air pressure causes it to be deflected, so that the greater the pressure, the greater the deflection and the larger the amplitude of the vibrations united, and the louder the sound produced.

In the device of the present invention when the air or gas under pressure reaches the box 1, the pressure bears on both sides of the plate 3 and also on the membrane 10; due to the pressure the latter membrane is deflected and moves with it the tube 7 which allows the motive fluid passage to produce waves by contraction and expansion.

Further the device cannot become blocked as the contact of the tube 7 and the plate 3 is interrupted as soon as the fluid enters the apparatus. However should the plate not be sufficiently rigid, at starting a pause or click may be produced owing to the fact that this plate is not subjected to exactly the same air pressure on both sides. In fact on the rear side the whole face receives pressure, but on the front side on starting, the center part is protected by the movable tube under strong spring pressure. Consequently there is a tendency to cause it to be somewhat deformed, as the plate follows the tube during its recoil until arrested by its natural rigidity. At this precise moment the plate can deflect due to its inherent elasticity and further owing to the sudden increase in total pressure on this face due to its disengagement of its center it returns sharply to the rear and produces a click, whereupon the conditions controlling it are stabilized due to the equality of pressure on the two faces and to the movement of the tube. To avoid this disadvantage that is to say to provide a soft starting of the signal and to insure a correct functioning of the device even with a very small air pressure, it will be sufficient to make the plate virtually very thick.

This may for instance be obtained by means of a rigid connection, screw, rivet or the like to a fixed bar mounted behind the plate which by its thickness or curvature resists flexure to prevent movement of the plate.

The sound will be constant, and will be produced by the slightest current of air, which shows that the sound is not due to the vibrations of the plate, but rather to the shocks on the section of movable tube and the production thereby of swelled and contracted waves which reinforce the sound produced by the shock and propels it into the trumpet.

I declare that what I claim is:—

1. A sound signaling device comprising in combination a rigid plate, an axially vibrating tube facing and at right angles to said plate, and means to project a stream of fluid under pressure through the opening of variable cross section between said plate and said tube.

2. A sound signaling device comprising a plate, means to maintain it in a predetermined plane, an open tube normally abutting against said plate, means to vibrate said tube axially and means to lead the fluid under pressure to said tube, said fluid passing between the plate and the end of the tube.

3. A sound signaling device comprising a plate, means to lead fluid under pressure to both sides of said plate, a tube at right angles to and contacting with one side of said plate, and means to vibrate said tube axially.

4. A sound signaling device comprising a plate, clamping means securing said plate on its periphery, closed chambers on each side of said plate, a tube open at both ends entering one chamber and abutting axially against the plate, and means to vibrate the said tube axially.

5. A sound signaling device comprising a plate, clamping means securing said plate at its periphery, a pair of closed fluid pressure chambers one on each side of said plate, a common fluid inlet to said chambers, a tube forming an outlet to one chamber and contacting axially with the plate on one side, a flexible diaphragm subjected to the fluid pressure, and means to connect said diaphragm with said tube.

6. A sound signaling device comprising a plate, clamping means securing said plate at its periphery, a pair of closed fluid pressure chambers one on each side of said plate, a common fluid inlet to said chambers, a tube forming an outlet to one chamber and contacting axially with the plate on one side, a flexible diaphragm in a parallel plane to said plate subject to the fluid pressure, and means to connect said diaphragm with said tube.

7. A sound signaling device comprising a plate, clamping means securing said plate at its periphery, a pair of closed fluid pressure chambers one on each side of said plate, a common fluid inlet to said chambers, a tube forming an outlet to one chamber and contacting axially with the plate on one side, a flexible diaphragm in the chamber through which the tube passes and in a parallel plane to said plate subject to the fluid pressure, and means to contact said diaphragm with said tube.

8. A sound signaling device comprising a plate, clamping means securing said plate at its periphery, a pair of closed fluid pressure chambers one on each side of said plate, a common fluid inlet to said chambers, a tube forming an outlet to one chamber and contacting axially with the plate on one side, a flexible diaphragm surrounding the tube and in a parallel plane to the plate subject to the fluid pressure, and means to connect said diaphragm with said tube.

9. A sound signaling device comprising a plate, clamping means securing said plate at its periphery, a pair of closed fluid pressure chambers one on each side of said plate, a common fluid inlet to said chambers, a tube forming an outlet to one chamber and contacting axially with the plate on one side, a flexible diaphragm subject to the fluid pressure, and means to connect said diaphragm with said tube and a spring holding said tube normally in contact with said plate.

10. A sound signaling device comprising a plate, clamping means securing said plate at its periphery, a pair of closed fluid pressure chambers one on each side of said plate, a common fluid inlet to said chambers, a tube forming an outlet to one chamber and contacting axially with the plate on one side, a flexible diaphragm subject to the fluid pressure, and means to connect said diaphragm with said tube and a spring holding said tube normally in contact with said plate and tending to distort the diaphragm against the air pressure.

11. A sound signaling device comprising a plate, clamping means securing said plate at its periphery, a pair of closed fluid pressure chambers one on each side of said plate, a common fluid inlet to said chambers, a tube forming an outlet to one chamber and contacting axially with the plate on one side, a flexible diaphragm subject to the fluid pressure, and means to connect said diaphragm with said tube and means to project a fluid pressure stream on a wall of the chamber opposite the tube.

12. A sound signaling device comprising in combination a rigid plate, an axially vibrating tube facing and at right angles to said plate, and means to project a stream of fluid under pressure through the opening of variable cross section between said plate and said tube, and means to secure the plate to an undeformable part.

13. A sound signaling device comprising a plate, clamping means securing said plate at its periphery, a pair of closed fluid pressure chambers one on each side of said plate, a common fluid inlet to said chambers, a tube forming an outlet to one chamber and contacting axially with the plate on one side, a flexible diaphragm subject to the fluid pressure, and means to connect said diaphragm with said tube and means to secure the plate to an undeformable part.

In witness whereof, I have hereunto signed my name this 4th day of June, 1919, in the presence of two subscribing witnesses.

LOUIS CHOLLET.

Witnesses:
ANTHONY MONTEILHES,
CHAS. P. PRESSLY.